Aug. 18, 1959    F. C. ECKER    2,900,002
ANTI-SKID MECHANISM

Filed Jan. 31, 1958    4 Sheets-Sheet 1

INVENTOR.
FRED C. ECKER,
BY
McMorrow, Berman & Davidson
ATTORNEYS.

Aug. 18, 1959  F. C. ECKER  2,900,002
ANTI-SKID MECHANISM

Filed Jan. 31, 1958  4 Sheets-Sheet 2

INVENTOR.
FRED C. ECKER,
BY
McMorrow, Berman & Davidson
ATTORNEYS.

Aug. 18, 1959  F. C. ECKER  2,900,002
ANTI-SKID MECHANISM
Filed Jan. 31, 1958  4 Sheets-Sheet 3
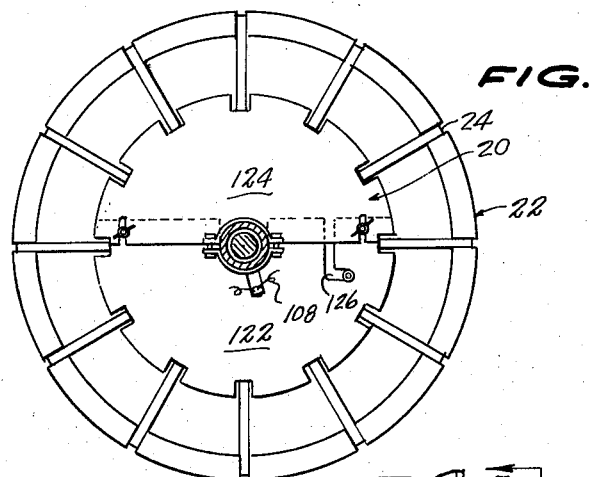
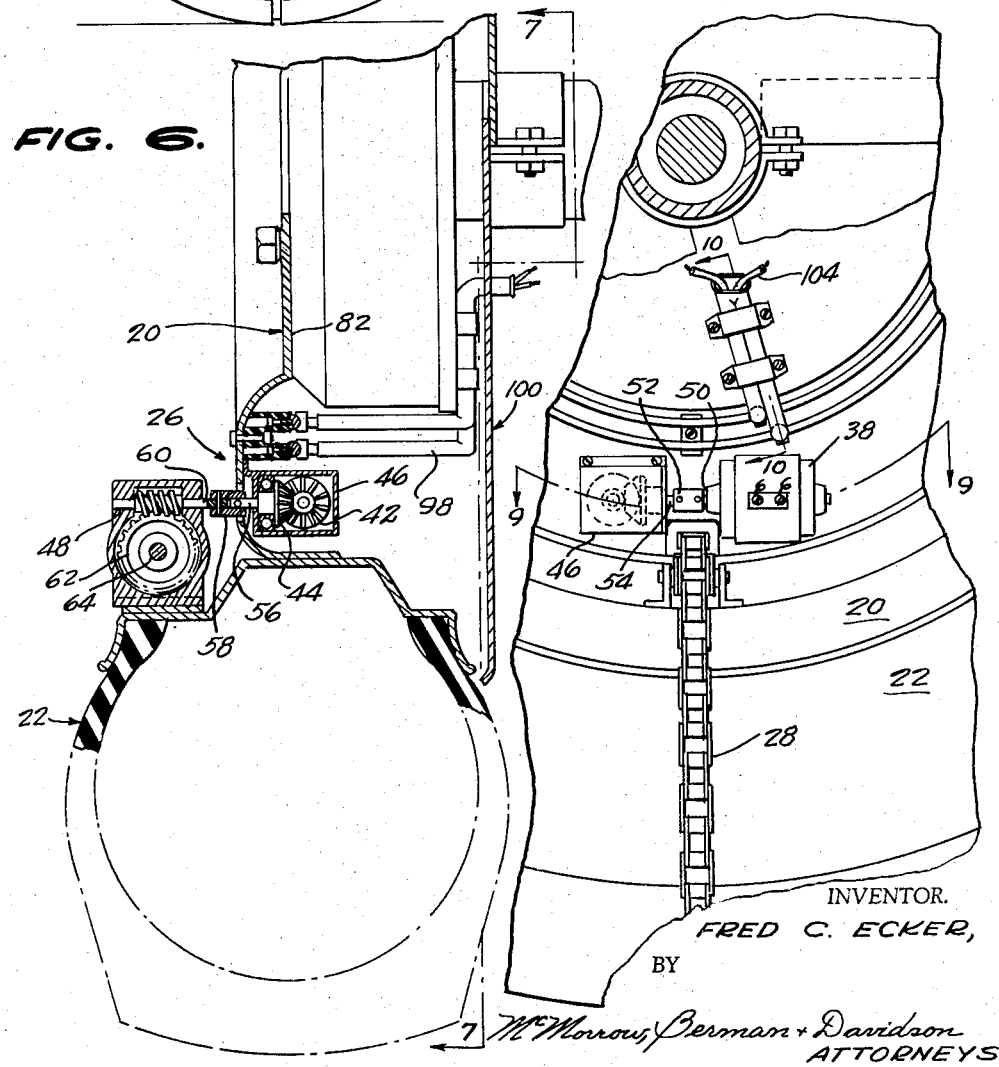
INVENTOR.
FRED C. ECKER,
BY
McMorrow, Berman + Davidson
ATTORNEYS.

Aug. 18, 1959     F. C. ECKER     2,900,002
ANTI-SKID MECHANISM
Filed Jan. 31, 1958     4 Sheets-Sheet 4
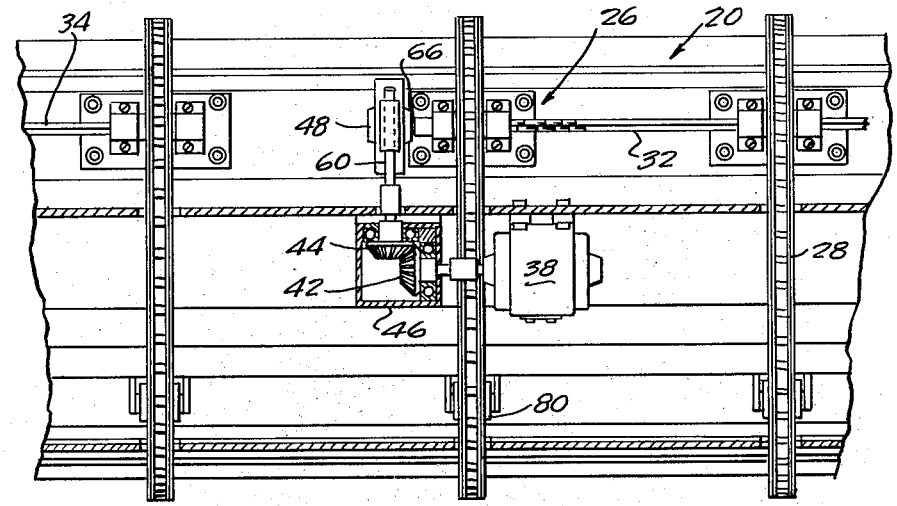
FIG. 9.
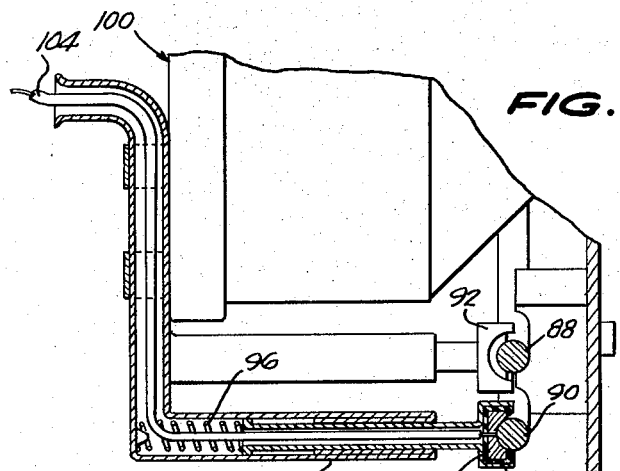
FIG. 10.
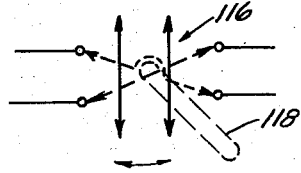
FIG. 12.
FIG. 11.
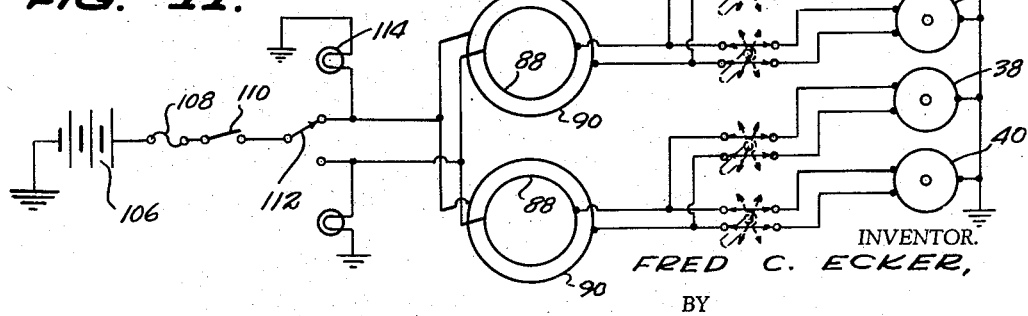
INVENTOR.
FRED C. ECKER,
BY
McMorrow, Berman + Davidson
ATTORNEYS.

United States Patent Office 2,900,002
Patented Aug. 18, 1959

2,900,002

ANTI-SKID MECHANISM

Fred C. Ecker, Seattle, Wash.

Application January 31, 1958, Serial No. 712,465

3 Claims. (Cl. 152—216)

The present invention relates to vehicles generally and in particular to anti-skid mechanism for attachment to a vehicle.

An object of the present invention is to provide an anti-skid mechanism for a vehicle which may be shifted from an out-of-use position to an in-use position by the operator of the vehicle without leaving the seat of a vehicle and merely by actuation of a switch by the operator of the vehicle.

Another object of the present invention is to provide an anti-skid mechanism which is simple in structure, sturdy in construction, and one which is economically feasible.

These and other objects and advantages of the present invention will be fully apparent from the following description when taken in conjunction with the annexed drawings, in which:

Figure 6 is a sectional view, on an enlarged scale, taken on the line 6—6 of Figure 1;

Figure 7 is a fragmentary elevational view taken on the line 7—7 of Figure 6;

Figure 8 is an elevational view of the wheel shown in Figure 1, on a reduced scale, as seen from the reverse side;

Figure 9 is a fragmentary view taken on the line 9—9 of Figure 7;

Figure 10 is a fragmentary sectional view, on an enlarged scale, taken on the line 10—10 of Figure 7;

Figure 11 is a schematic view of the electrical circuit used with the present invention; and Figure 12 is a schematic view showing the reversing switch used with the mechanism of the present invention.

Figure 1:
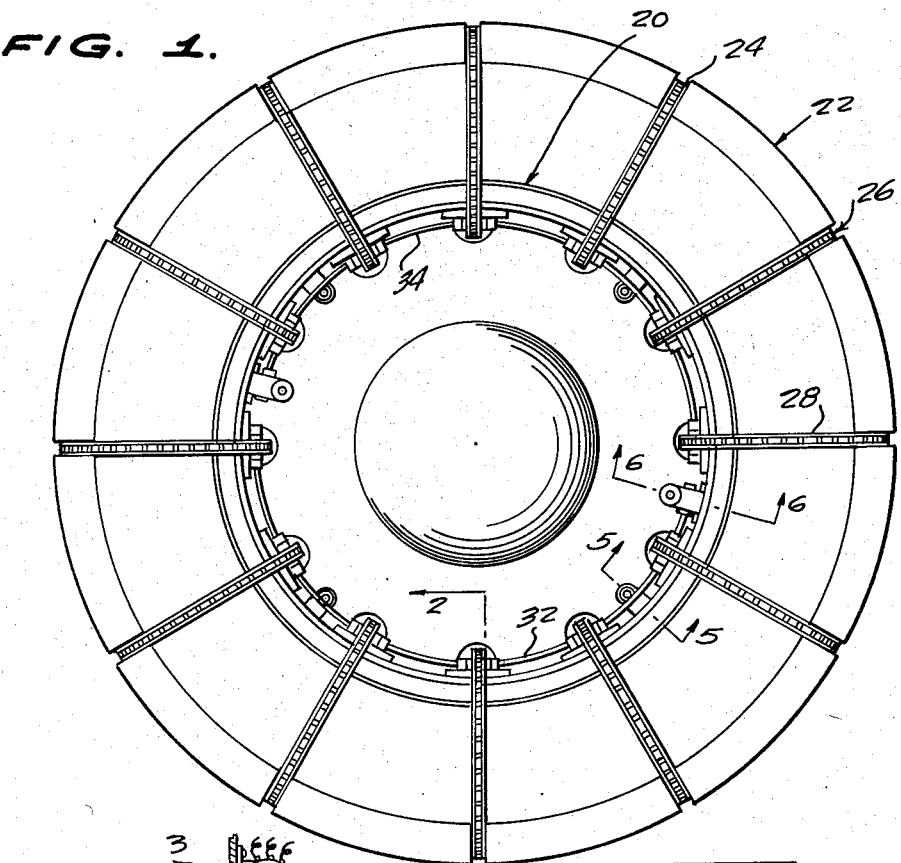
Figure 1 is an elevational view of a wheel of a vehicle, with the anti-skid mechanism of the present invention installed thereon.

Referring in greater detail to the drawings in which like numerals indicate like parts throughout the several views, in Figures 1 and 8 the reference numeral 20 designates a traction wheel and rim of a vehicle such as an automobile, the numeral 22 designating the tire carried by the wheel rim. The tire 22 is provided with a plurality of grooves 24 extending transversely through the tread surface and arranged in spaced relation about the tread surface. The anti-skid mechanism of the present invention is designated generally by the reference numeral 26 and comprises an endless chain 28 positioned in each of the grooves and extending about the adjacent portion of the wheel rim 20, and about the pneumatic tire 22.

Figure 2:
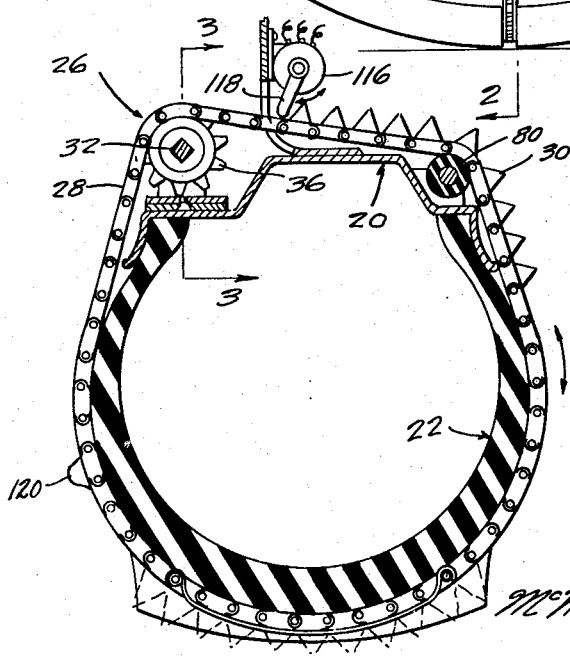
Figure 2 is a sectional view, on an enlarged scale, taken on the line 2—2 of Figure 1.
Figure 3:
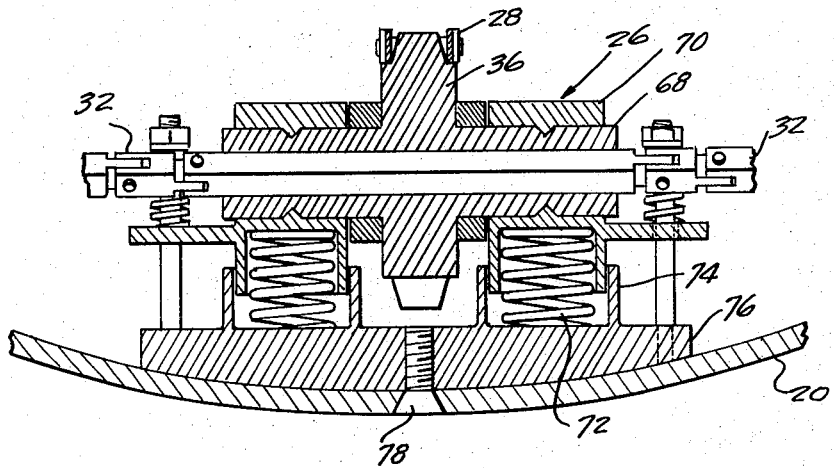
Figure 3 is a sectional view taken on the line 3—3 of Figure 2, and on an enlarged scale.
Figure 4:
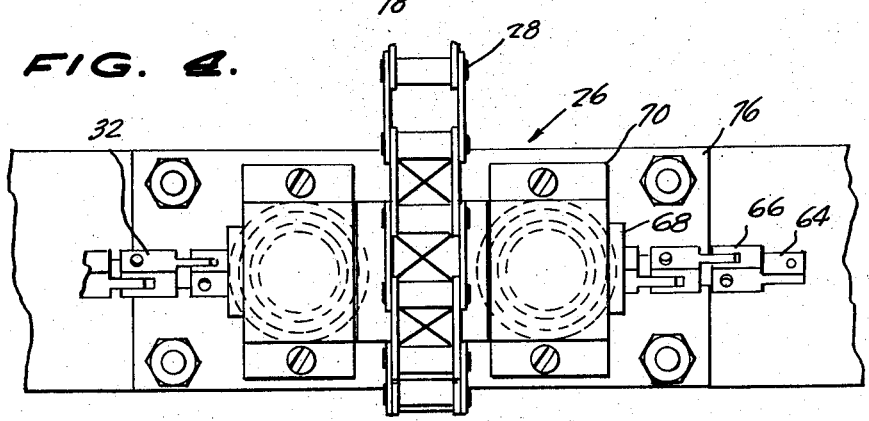
Figure 4 is a fragmentary plan view of the assembly shown in Figure 3.

Each of the chains 28 has on a part thereof and extending therealong a plurality of spaced projecting points, constituting traction elements, as at 30 in Figure 2. The chains 28 are normally positioned with the points 30 along the side of the tire 22 and out of the adjacent groove 24.

Means is provided connecting each of the chains 28 to the rim 20 for movement of each chain from the position in which the part of the chain having the points 30 is adjacent the side of the tire 22 to a position in which such part is wholly within the groove 24. Specifically, this means includes a pair of flexible driven shafts 32 and 34 extending about and journaled on one-half of the wheel rim 20. Each shaft 32 and 34 carries a plurality of sprockets 36 arranged in spaced relation therealong. Portions of the chains 28 travel over the sprockets 36 and are in meshing engagement therewith.

Drive means is provided by the present invention for effecting the movement in unison of all of the chains 28 so that the points 30 may be shifted to a position where they engage the ground and make the tire 22 nonskid. Specifically, this drive means includes a pair of reversible electric motors 38 and 40, each operatively connected to the shafts 32 and 34, respectively, by means of a pair of bevel gears 42 and 44 mounted within the housing 46 and a speed reducing unit 48 mounted exteriorly of the rim 20. The connections of the motors 38 and 40 to the driven shafts 32 and 34 are identical and will be described with reference to the motor 38 and the associated shaft 32.

The shaft 50 of the motor 38 is connected by a coupling member 52 to the shaft 54 which projects from one side of the housing 46. The first bevel gear 42 is carried by the free end of the shaft 54 and is in mesh with the other gear 44 which is carried upon another shaft 56 projecting at right angles with respect to the shaft 54. Another coupling element 58 connects the projecting end portion of the shaft 56 to a worm shaft 60 journaled in the speed reducing unit 48. The worm of the worm shaft 60 is in mesh with the teeth of a gear 62 mounted upon the output shaft 64 of the speed reducing unit 48.

The projecting end portion of the shaft is connected to the end of the driven shaft 32 adjacent the speed reducing unit 48, as at 66 in Figure 9. Each of the sprockets 36 has an elongated hub 68 supported in bearing blocks 70 and the latter are mounted on springs 72 which are carried in cup members 74 secured to a base 76 and secured by a cap screw 78 to the tire rim 20.

Associated with each of the chains 28 is a roller 80, fabricated of rubber, neoprene, nylon, or the like, supporting the chain 28 away from the side of the rim 20, as shown in Figure 2. Each roller 80 is journaled for free rotation upon the rim 20.

Figure 5:
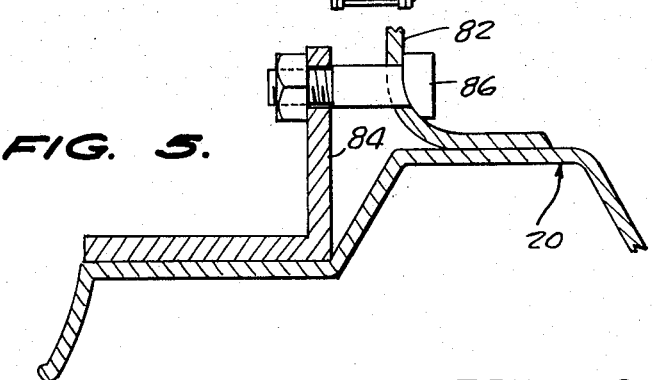
Figure 5 is a sectional view, on an enlarged scale, taken on the line 5—5 of Figure 1.

The rim 20 is mounted upon the wheel hub 82 by conventional means, as shown in Figure 5. An L-shaped bracket 84 has one leg secured by welding to one flange of the rim 20 and a nut and bolt assembly 86 secures the other leg of the bracket 84 to the wheel hub 82.

In Figures 6, 7 and 10, the numerals 88 and 90 designate slip rings carried by the wheel hub 82 and concentric therewith and against which bear the free ends of conductor members 92 and 94, respectively. As shown in Figure 10, with reference to the conductor member 94, it will be seen that a spring 96 biases the conductor 94 outwardly of a tubular conduit 98 which is supported upon the rear wall of the brake housing 100. Suitable installation as at 102 in Figure 10 isolates the conductor members 92 and 94 from grounding on the housing 100 and electric cables 104 extending through the conduits associated with the conductor members 92 and 94 connect the members 92 and 94 to a source of current within the vehicle in which the apparatus of the present invention is installed.

In Figure 11 this current source is designated by the reference numeral 106, representing the battery of an automobile having one side grounded on the frame of the automobile. In circuit with the slip rings 88 and 90, installed in each of the traction wheels of the automobile, is a fuse 108, a main switch 110, an actuating switch 112, indicator lights 114 and reversing switches as at 116 for each of the pairs of motors 38 and 40. The reversing switch is shown schematically in Figure 12 in which the actuating lever is shown in dotted lines and indicated by the reference numeral 118. The reversing switch 116 is also seen in Figure 2 with the lever 118 in the path of movement of the last point 30 in the group of points on the chain 28. An abutment 120 carried by the chain 28 at a point opposite to the points 30 also serves to shift the lever 118 to actuate the switch 116 when the chain 28 travels to the position in which the points 30 are downwardly and in the ground-engaging position.

The rear or inner face of the brake housing 100 is covered by lower and upper shell covers 122 and 124, as shown in Figure 8. The cables 104 project through suitable openings provided in the lower shell cover 122 and a conventional opening 126 for the passage of the vehicle's brake cables is provided.

In operation, the operator of the vehicle can effect the movement of the chains 28 from the position in which the points 30 are out of engagement with the ground surface to the position in which they are in engagement with the ground surface by closing of the main switch 110, which may be the ignition switch of the vehicle, and by closing the switch 112 to the position in which current is supplied to either the ring 88 or the ring 90. With each of the switches 116 in one position and the actuating lever 118 in the path of movement of the points 30 or the abutment 120, it will be seen that the motors 38 and 40 will be energized and all the sprockets 36 turned in unison to drive the chains 28. When the chains 28 reach the one position with the points in the grooves in the tread of the tire 22, the abutment 120 will engage the lever 118 and reverse the switches 116. Meanwhile, the operator of the car or automobile will have opened the switch 112 until he desires to retract the points 30 at which time he will energize the other of the rings 88 or 90 and the reversal of the chains 28 will take place automatically.

While only a preferred embodiment of the present invention has been shown and described, other embodiments are contemplated and numerous changes and modifications may be made therein without departing from the spirit of the invention as set forth in the appended claims.

What is claimed is:

1. The combination with a vehicle traction wheel rim, and a pneumatic tire carried by said wheel rim, said tire being provided with a plurality of grooves extending transversely through the tread surface and arranged in spaced relation about said tread surface, of an anti-skid mechanism comprising an endless chain positioned in each of said grooves and extending about the adjacent portion of said wheel rim, each of said chains having on a part thereof and extending therealong a plurality of spaced projecting traction elements, said parts of said chains being each normally held along the side of said tire and out of the adjacent groove, means connecting each of said chains to said wheel rim for movement of said chain from the position in which said part is adjacent the side of the tire to a position in which said part is wholly within said groove, said means including a flexible driven shaft extending about and journaled on said wheel rim, a plurality of sprockets arranged in spaced relation and carried by said driven shaft, said sprockets being in meshing engagement with said chains, a roller in lateral alignment with each of said sprockets and journaled on said wheel rim for free rotation, each of said rollers rollably engaging the underneath portion of the adjacent chain to hold it away from the contiguous side of said wheel rim, and drive means operatively connected to said driven shaft for effecting in unison the movements of said chains.

2. The combination with a vehicle traction wheel rim, and a pneumatic tire carried by said wheel rim, said tire being provided with a plurality of grooves extending transversely through the tread surface and arranged in spaced relation about said tread surface, of an anti-skid mechanism comprising an endless chain position in each of said grooves and extending about the adjacent portion of said wheel rim, each of said chains having on a part thereof and extending therealong a plurality of spaced projecting traction elements, said parts of said chains being each normally held along the side of said tire and out of the adjacent groove, means connecting each of said chains to said wheel rim for movement of said chain from the position in which said part is adjacent the side of the tire to a position in which said part is wholly within said groove, said means including a flexible driven shaft extending about and journaled on said wheel rim, a plurality of sprockets arranged in spaced relation and carried by said driven shaft, said sprockets being in meshing engagement with said chains, and drive means operatively connected to said driven shaft for effecting in unison the movements of said chains.

3. The combination with a vehicle traction wheel rim, and a pneumatic tire carried by said wheel rim, said tire being provided with a plurality of grooves extending transversely through the tread surface and arranged in spaced relation about said tread surface, of an anti-skid mechanism comprising an endless chain positioned in each of said grooves and extending about the adjacent portion of said wheel rim, each of said chains having on a part thereof and extending therealong a plurality of spaced projecting traction elements, said parts of said chains being each normally held along the side of said tire and out of the adjacent groove, a flexible driven shaft extending about a portion of said wheel rim and journaled on said rim, another flexible driven shaft extending about the remaining portion of said wheel rim and journaled on said rim, a plurality of sprockets arranged in spaced relation and carried by each of said driven shafts, said sprockets being in meshing engagement with said chains, and drive means operatively connected to each of said driven shafts for effecting in unison the movements of said chains.

References Cited in the file of this patent
UNITED STATES PATENTS

| | | |
|---|---|---|
| 2,727,553 | Berueffy | Dec. 20, 1955 |
| 2,754,874 | Gardner | July 17, 1956 |
| 2,767,761 | O'Higgins | Oct. 23, 1956 |